United States Patent
DeSalvo et al.

(10) Patent No.: US 11,474,227 B1
(45) Date of Patent: Oct. 18, 2022

(54) DEVICES, SYSTEMS, AND METHODS FOR RADAR-BASED ARTIFICIAL REALITY TRACKING

(71) Applicant: META PLATFORMS TECHNOLOGIES, LLC, Menlo Park, CA (US)

(72) Inventors: Riccardo DeSalvo, Pasadena, CA (US); Giuseppe Castaldi, Apice (IT); Andrea Cusano, Caserta (IT); Vincenzo Galdi, Benevento (IT); Paolo Mattera, Benevento (IT); Roberto Parente, Cerreto Sannita (IT); Fereydoun Daneshgaran, La Crescenta, CA (US); Joseph Minh Tien, Alhambra, CA (US); Dustin Krogstad, Chino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 685 days.

(21) Appl. No.: 16/515,067

(22) Filed: Jul. 18, 2019

Related U.S. Application Data

(60) Provisional application No. 62/802,458, filed on Feb. 7, 2019.

(51) Int. Cl.
*G01S 13/42* (2006.01)
*G06F 3/01* (2006.01)
(Continued)

(52) U.S. Cl.
CPC ............ *G01S 13/42* (2013.01); *G06F 3/011* (2013.01); *G06K 19/0724* (2013.01); *G06K 19/07762* (2013.01); *G06T 19/003* (2013.01)

(58) Field of Classification Search
CPC ..... G01S 13/42; G06F 3/011; G06K 19/0724; G06K 19/07762; G06T 19/003
See application file for complete search history.

(56) References Cited

U.S. PATENT DOCUMENTS

| 4,599,618 A * | 7/1986 | Haendel ............... G01S 13/341 342/87 |
| 8,638,254 B2 | 1/2014 | Itoh et al. |

(Continued)

OTHER PUBLICATIONS

DeSalvo Riccardo, "Devices, Systems, and Methods for Radar-Based Artificial Reality Tracking", U.S. Appl. No. 16/391,229 dated Apr. 22, 2019, 89 pages.

(Continued)

*Primary Examiner* — Thomas D Alunkal
(74) *Attorney, Agent, or Firm* — FisherBroyles, LLP

(57) ABSTRACT

The disclosed apparatus may include at least one transponder that (1) is located on a wearable device worn by a user and (2) retransmits signals received at the transponder after shifting frequencies of the received signals to a certain frequency range. The apparatus may also include at least one radar device that (1) transmits a frequency-modulated radar signal to the transponder and (2) receives signals whose frequencies are within the certain frequency range. In addition, the apparatus may include a processing device that (1) detects a signal returned to the radar device from the transponder, (2) calculates, based on the returned signal, a distance between the transponder and the radar device, and then (3) determines, based on the distance between the transponder and the radar device, a current physical location of at least a portion of the user. Various other apparatuses, systems, and methods are also disclosed.

20 Claims, 14 Drawing Sheets

(51) Int. Cl.
*G06K 19/07* (2006.01)
*G06K 19/077* (2006.01)
*G06T 19/00* (2011.01)

(56) References Cited

U.S. PATENT DOCUMENTS

| | | | |
|---|---|---|---|
| 2006/0128503 A1* | 6/2006 | Savarese | A63B 43/00 473/353 |
| 2008/0088503 A1 | 4/2008 | Beasley | |
| 2008/0150899 A1 | 6/2008 | Lin | |
| 2008/0291158 A1* | 11/2008 | Park | G06F 3/014 345/156 |
| 2009/0212920 A1 | 8/2009 | Yang | |
| 2009/0289831 A1 | 11/2009 | Akita et al. | |
| 2011/0007035 A1* | 1/2011 | Shai | G06F 3/0338 345/179 |
| 2012/0242481 A1* | 9/2012 | Gernandt | G06K 19/0705 340/572.1 |
| 2015/0021481 A1 | 1/2015 | Cavallaro et al. | |
| 2016/0363664 A1* | 12/2016 | Mindell | G01S 7/352 |
| 2018/0074600 A1* | 3/2018 | Park | G01S 13/42 |
| 2018/0088339 A1 | 3/2018 | Aruga | |
| 2019/0064341 A1 | 2/2019 | Bunch et al. | |
| 2019/0182415 A1 | 6/2019 | Sivan | |
| 2019/0200914 A1 | 7/2019 | Wagner et al. | |
| 2020/0089314 A1* | 3/2020 | Poupyrev | G01S 13/888 |
| 2020/0174095 A1 | 6/2020 | Altintas et al. | |

OTHER PUBLICATIONS

DeSalvo Riccardo, "Devices, Systems, and Methods for Radar-Based Artificial Reality Tracking", U.S. Appl. No. 16/515,066 dated Jul. 18, 2019, 84 pages.

"Radar Basics", URL: http://www.radartutorial.eu/02.basics/Frequency%20Modulated%20Continuous%20Wave%20Radar.en.html, Apr. 14, 2014, pp. 1-6.

Wikipedia, "Transponder", URL: https://en.wikipedia.org/wiki/Transponder, Apr. 5, 2005, pp. 1-4.

Desalvo et al., "Devices, Systems, and Methods for Radar-Based Artifical Reality Tracking", U.S. Appl. No. 62/802,458 dated Jul. 2, 2019, 61 pages.

* cited by examiner

DEVICES, SYSTEMS, AND METHODS FOR RADAR-BASED ARTIFICIAL REALITY TRACKING

CROSS REFERENCE TO RELATED APPLICATION

This application claims the benefit of U.S. Provisional Application No. 62/802,458, filed on Feb. 7, 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
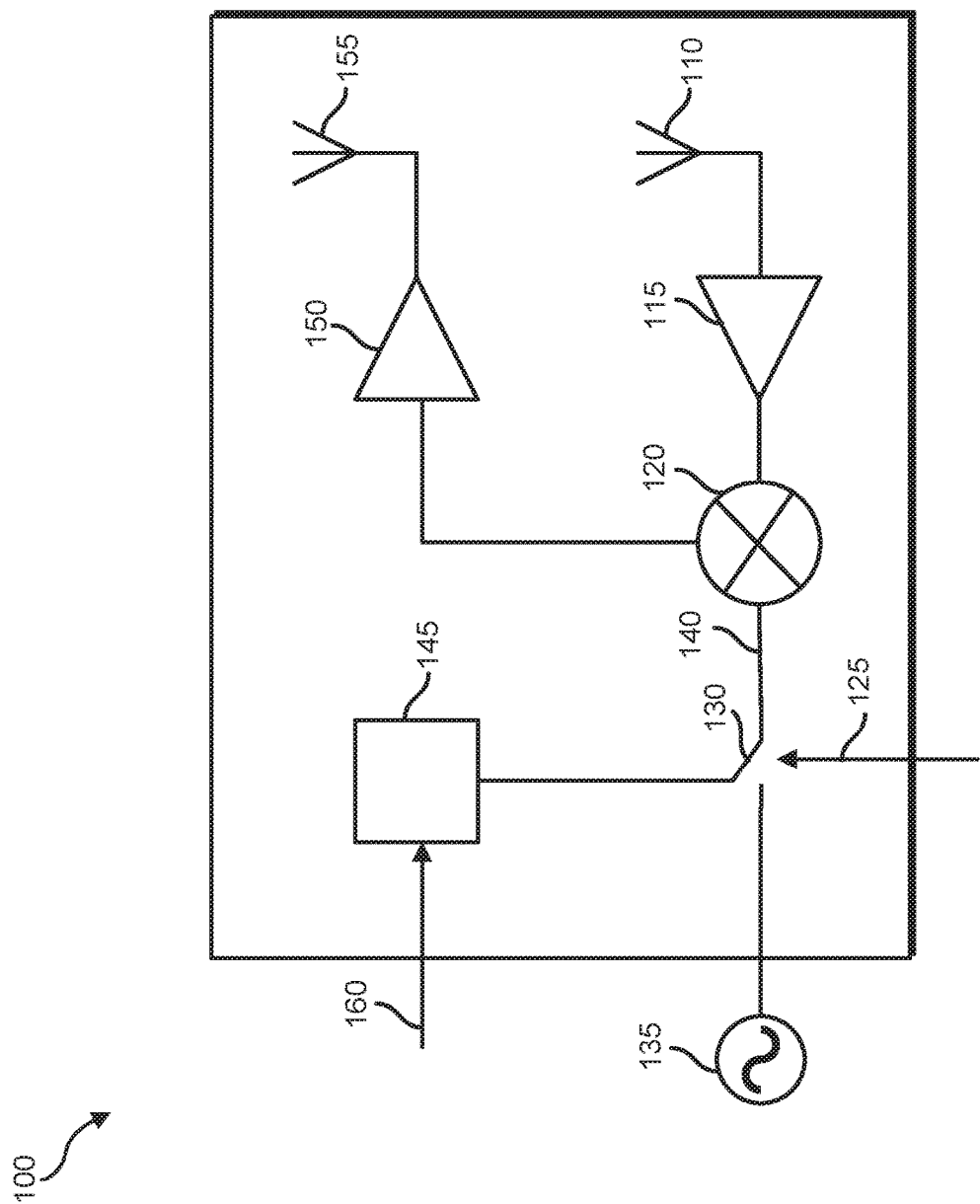
FIG. 1 is a diagram of an exemplary transponder that may be used in connection with embodiments of this disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION OF EXEMPLARY EMBODIMENTS

Over the last several years, artificial reality systems have revolutionized the way people experience various kinds of digital media. For example, an artificial reality headset may allow users to experience realistic, immersive virtual environments while playing video games, during flight simulation training, or even when interacting with co-workers around the globe. In addition to such artificial-reality applications, wearable artificial reality devices may also enable users to augment reality and/or combine certain aspects of reality with those of the virtual world.

Despite significant advances in such technology, traditional artificial reality systems may still have certain deficiencies that negatively impact the overall user experience. For example, some artificial reality systems may struggle to accurately and/or quickly track the position of a user and/or an artificial reality device worn by the user. As such, the artificial reality system may be unable to update virtual content (such as graphics or haptic feedback) with sufficient speed and/or resolution.

The present disclosure, therefore, identifies and addresses a need for additional devices, systems, and methods for radar-based artificial reality tracking. In particular, the disclosed devices, systems, and methods may determine the current location of all or a portion of a user by calculating the distance between one or more radar devices and one or more transponders that are located on and/or nearby the user. As will be explained in greater detail below, these devices, systems, and methods may provide numerous features and benefits.

The disclosed radar systems may utilize various types of radar to track or determine the position, orientation, and/or physical location of a wearable artificial reality device and/or a user of an artificial reality system. In particular, the disclosed radar systems may utilize frequency-modulated continuous-wave (FMCW) radar. In an FMCW radar system, a radar device may transmit a frequency-modulated signal (e.g., a signal that sweeps between and/or within a certain range of frequencies). In one embodiment, the frequency of an FMCW signal may vary linearly over a fixed period of time. As an example, the frequency of an FMCW signal may linearly sweep between 120 gigahertz and 130 gigahertz over a time period of 10 milliseconds.

After transmitting an FMCW signal, a radar system may receive a reflected, echoed, and/or otherwise returned signal from a target that received and/or encountered the FMCW signal. Because the frequency of the FMCW signal changes over time, the instantaneous frequency of the returned signal may differ from the instantaneous frequency of the FMCW signal at the point in time that the returned signal is received at the radar system. For example, the instantaneous frequency of the returned signal may be offset by a certain amount relative to the FMCW signal. This frequency offset may be related to and/or a result of the time required for the FMCW signal to travel from the radar system to the target and back to the radar system. Because the frequency of the FMCW signal has a known rate of change, the radar system may determine the range of (e.g., distance to) the target based at least in part on the frequency offset of the returned signal.

The radar system may identify the frequency offset of the returned signal in a variety of ways. In one embodiment, the radar system may combine (e.g., multiply) the returned signal and the original FMCW signal (which may be referred to as a reference signal). The radar system may then determine the frequency components of the combined signal. In some examples, the frequency components may include an offset frequency corresponding to the amount by which the frequency of the returned signal has shifted. This offset frequency may be referred to as a beat frequency. In some embodiments, the value of the beat frequency may be directly proportional to the range of the target. Accordingly, extracting the beat frequency from the combined signal may enable the radar system to determine the range of the target.

The disclosed radar systems may determine the range of a variety of types of targets. In one example, a radar system may determine the range of passive targets (e.g., targets that simply reflect signals and do not actively transmit signals). Examples of passive targets may include a body part of a user, a wall, and/or a piece of furniture. In other examples, the disclosed radar systems may determine the range of active targets (e.g., targets that repeat, transmit, and/or modify received signals). Examples of active targets may include repeaters and/or transponders.

Utilizing active targets in addition to or instead of passive targets may provide a variety of benefits and advantages. For example, an active target may be capable of amplifying an FMCW signal before returning the FMCW signal to a radar device, thereby increasing the power and/or improving the quality of the FMCW signal. In addition, an active target (such as a transponder) may generally be smaller in size than a passive target (such as a fingertip). For example, the transponders utilized in the disclosed radar systems may have a diameter of several millimeters. Due to their small and/or finite size, active targets may have a smaller effective area of reflection and therefore may provide returned signals with cleaner and/or more precise frequency profiles than passive targets. In addition, the small size of an active target may facilitate precise and/or accurate localization of the object to which it is attached.

The radar systems disclosed herein may track and/or determine the position, orientation, and/or physical location of any type or form of wearable artificial reality device, including headsets, head-mounted displays, helmets, neckbands, wristbands, belts, ankle bands, and/or gloves. In some examples, a radar system may include multiple types of wearable artificial reality devices. For example, a radar system may include a headset worn on a user's head and a glove worn on the user's hand. In this example, the radar system may track changes in the relative distance between the headset and portions of the glove. Specifically, a radar device secured to the headset may periodically determine the distance between the radar device and one or more transponders secured to the glove. Additionally or alternatively, the radar system may determine a location of the glove and/or the headset within a physical environment surrounding the user.

The radar systems disclosed herein may utilize information about the position, orientation and/or physical location of a wearable artificial reality device in a variety of ways. In one example, a radar system may pass information about a current position of the device (or a change in the position of the device) to an artificial reality system to facilitate modifying one or more virtual components of the artificial reality system. Specifically, based on this information, the artificial reality system may adjust the location at which the user perceives a portion of virtual content (such as a graphic or haptic feedback) to account for the current (e.g., updated) position of the wearable artificial reality device. Additionally or alternatively, the artificial reality system may update a remote view of all or a portion of the user as the user is perceived, via radar, within their physical environment.

In some embodiments, the disclosed radar systems may be utilized in applications beyond artificial reality or similar applications (such as virtual reality and/or augmented reality). For example, these radar systems may be utilized in applications involving the control of an apparatus (such as an electronic device, a data input mechanism, a piece of machinery, a vehicle, etc.) using one or more body parts or gestures.

In some examples, a radar system may include multiple radar devices. As will be explained in greater detail below, these radar devices may be secured to a wearable device worn by a user and/or secured at a stationary location within the physical environment surrounding the user. In one embodiment, each radar device within a radar system may be separated by at least a certain distance. Additionally or alternatively, the radar devices may be distributed in a certain pattern and/or configuration. For example, the radar system may include an artificial reality headset equipped with a radar device located near each of the user's ears and a radar device located near the top of the user's head. Such a configuration may facilitate three-dimensional localization and/or triangulation of a transponder.

Similarly, a radar system may include multiple transponders. In some embodiments, each of these transponders may be secured to a wearable device worn by the user (e.g., a different wearable device than the wearable device that secures one or more radar devices). For example, an artificial reality glove may include a transponder corresponding to each of a user's fingertips, a transponder corresponding to each of the user's knuckles, and additional transponders corresponding to various locations on the user's hands, palms, and/or fingers. Incorporating a large number of transponders into a wearable device may increase the resolution with which an artificial reality system is capable of tracking the posture of a user's limbs and/or detailed movements of the wearable device.

In some embodiments, the disclosed radar systems may include one or more features that enable a transponder or other active target to return a received FMCW signal that has an intentional (e.g., predetermined) offset frequency. For example, before returning an FMCW signal, a transponder may be designed and/or directed to shift the carrier frequency of the FMCW signal by a certain amount (e.g., 1 megahertz, 2 megahertz, etc.).

Such intentional frequency offsets within returned signals may provide several benefits and advantages for a radar system. For example, an intentional frequency offset may enable a radar system to identify a particular transponder that returned the signal (e.g., from within a group of transponders that each shift the frequency of returned signals by a different amount). In addition, a transponder may shift the frequency of a returned signal into a certain (e.g., higher) frequency range that avoids and/or decreases ambient clutter. In some embodiments, shifting the frequency of a returned signal into such a frequency range may enable and/or improve localization of close-range targets. For example, because a beat frequency decreases as the range of a target decreases, beat frequencies associated with targets that are located nearby a radar device may be relatively low. In some cases, these beat frequencies may fall within the frequency range of ambient clutter signals and, therefore, may be difficult to extract or identify. Shifting the frequency of a returned signal to a higher frequency range may reduce or eliminate this problem.

The following will provide, with reference to FIG. 1, detailed descriptions of exemplary transponders that may be used in connection with the disclosed embodiments. Detailed descriptions of exemplary apparatuses for extracting beat frequencies will be provided in connection with FIGS. 2 and 3. In addition, detailed descriptions of exemplary artificial reality devices and artificial reality environments that may be used in connection with the disclosed embodiments will be provided in connection with FIGS. 4-7. Detailed descriptions of corresponding computer-implemented methods will be provided in connection with FIG. 8. Finally, detailed descriptions of exemplary augmented or virtual reality devices that may be used with embodiments of this disclosure will be provided in connection with FIGS. 9-14.

FIG. 1 is an illustration of an exemplary transponder 100. In some embodiments, the term "transponder" may refer to any type or form of device that emits a signal in response to receiving a signal. In one example, a transponder may emit a signal that is the same as or similar to a signal that the transponder received. For example, the transponder may simply retransmit a received signal (e.g., after amplifying the received signal). In other embodiments, a transponder may alter a received signal and then transmit the altered signal. For example, a transponder may shift the frequency of a received signal by a certain amount before retransmitting the received signal.

As shown in FIG. 1, transponder 100 may include a receiver 110 that receives FMCW radar signals from radar devices. After receiver 110 receives a signal, receiver 110 may pass the signal to an amplifier 115 that increases the power of all or a portion of the received signal. In one embodiment, amplifier 115 may represent a low-noise amplifier. In some examples, transponder 100 may retransmit the received signal after the received signal has been amplified. For example, amplifier 115 may pass the amplified signal directly to a transmitter 155. In other embodiments, transponder 100 may shift the frequency of the received signal by a certain amount before retransmitting the received signal.

Figure 2:
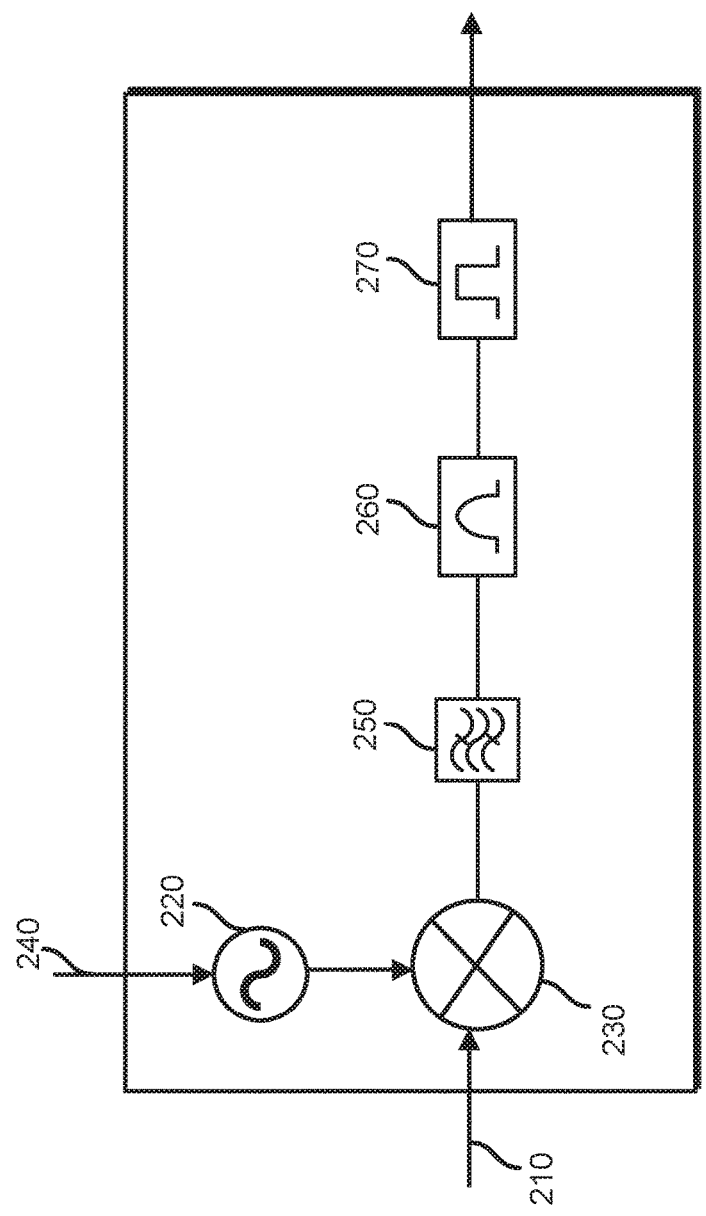
FIG. 2 is a diagram of an exemplary apparatus for extracting beat frequencies that may be used in connection with embodiments of this disclosure.

Transponder 100 may shift the frequency of the received signal in a variety of ways. In one embodiment, amplifier 115 may pass the received signal to a shifter 120. In this embodiment, shifter 120 may shift the frequency of the received signal based on a signal 140 that is also passed to shifter 120. For example, shifter 120 may add, multiply, combine and/or modulate the received signal and signal 140 in order to shift the frequency of the received signal by an amount corresponding to the frequency of signal 140. In one example, signal 140 may be provided by an oscillator 135 that outputs a signal with a certain frequency. Alternatively, signal 140 may be provided by a frequency divider 145 that generates a signal with a certain frequency by dividing, multiplying, adjusting, or otherwise processing a signal 160 that has a different frequency. As shown in FIG. 2, the input to shifter 120 may be controlled by a control signal 125 that is input to a switch 130.

After shifter 120 shifts the frequency of the received signal, shifter 120 may pass the shifted signal to an amplifier 150. After amplifying the shifted signal by a certain amount, amplifier 150 may pass the shifted signal to transmitter 155. Transmitter 155 may then transmit the shifted signal such that the shifted signal may be received by a radar device (e.g., the radar device that transmitted the received signal).

In one embodiment, signal 160 may be generated and/or transmitted by a remote component of a radar system. For example, signal 160 may be provided by a radar device and/or a processing device that directs, controls, and/or otherwise communicates with transponder 100. Signal 160 may be of any suitable frequency (such as 100 megahertz, 200 megahertz, etc.). In some embodiments, all or a portion of the transponders incorporated into a wearable device may receive signal 160 (either continuously during their operation or at various points in times). In this way, signal 160 may represent and/or act as a centralized clock for each transponder. In these embodiments, all or a portion of the transponders that receive signal 160 may divide signal 160 by a different amount. For example, each transponder may store an integer (such as 1, 2, 5, 10, etc.) that indicates and/or controls the amount by which the transponder divides signal 160. As a specific example, signal 160 may have a frequency of 50 megahertz and an instance of transponder 100 may store the integer 10 in connection with frequency divider 145. In this example, frequency divider 145 may output a signal with a frequency of 5 megahertz (and therefore the instance of transponder 100 may shift the frequency of a received FMCW radar signal by 5 megahertz).

In some examples, transmitting signal 160 to all or a portion of the transponders within a radar system may facilitate efficiently introducing unique frequency shifts into a large number (e.g., 50, 100, 300, etc.) of transponders incorporated into a wearable device. Furthermore, transmitting signal 160 to each transponder may generate a phase-locked radar system (e.g., a system in which each radar device and transponder receives and transmits modulation signals with aligned phases). Maintaining a phase-locked system may reduce and/or eliminate noise and/or interference generated by signals with misaligned phases.

Transponder 100 may include any additional or alternative component not illustrated in FIG. 1. For example, transponder 100 may include a processing device that directs and/or controls one or more components of transponder 100. Transponder 100 may also include any number or type of communication interfaces (such as Serial Peripheral Interfaces (SPIs)), memory devices, power detectors, power supplies, and/or additional components.

Transponder 100 may receive and transmit signals whose frequencies correspond to any suitable range and/or value. In one embodiment, transponder 100 may be capable of and/or configured to receive FMCW signals whose frequencies sweep between approximately 120 gigahertz and 130 gigahertz. In addition, transponder 100 may be capable of shifting the frequencies of signals by any suitable amount. For example, transponder 100 may shift the frequencies of received signals by 500 kilohertz, 1 megahertz, 2 megahertz, 15, megahertz, etc.

After receiving a returned FMCW signal from transponder 100, the disclosed radar systems may determine a beat frequency associated with the signal. Determining a beat frequency associated with a returned FMCW signal may be performed using a variety of signal processing steps and/or techniques. In one embodiment, a radar system may mix (e.g., multiply) a returned FMCW signal with a reference FMCW signal (e.g., the same FMCW signal that is currently being transmitted to transponder 100).

The signal produced by mixing the returned signal and the reference signal may be referred to as a beat signal. In some examples, this beat signal may contain one or more frequency components and/or harmonics. Specifically, the frequency of the beat signal may include and/or be represented by $f_c \mp f_b$, where $f_c$ corresponds to the carrier frequency of the FMCW signal returned by transponder 100 and $f_b$ corresponds to the beat frequency. In one embodiment, the carrier frequency may correspond to the intentional frequency shift introduced into the returned FMCW signal by transponder 100.

After generating the beat signal, the radar system may extract the beat frequency from the beat signal. As will be explained in greater detail below, extracting the beat frequency may be performed with various filters and/or frequency detection circuits. After extracting the beat frequency from the beat signal, the radar system may calculate and/or accurately estimate the range of transponder 100 based on the beat signal. For example, the radar system may implement the following formula:

$$\text{distance} = \frac{\text{speed of light} \times \text{beat frequency}}{2 \times \text{rate of radar frequency sweep}}.$$

Other embodiments of such a formula may account for certain real-world offsets, compensations, and/or processing delays that potentially affect the travel time of the transmission and/or returned signals.

FIG. 2 is an illustration of an exemplary apparatus 200 that facilitates radar-based artificial reality tracking. Apparatus 200 generally represents any type or form of electronic circuit or device designed to determine a beat frequency based on an FMCW radar signal returned by a transponder. In one embodiment, apparatus 200 may be part of and/or contained within a radar device. In other embodiments, apparatus 200 may be communicatively coupled to a radar device. In some examples, the term "radar device" may refer to any type or form of device that transmits radio waves to determine the range and/or velocity of a target.

As shown in FIG. 2, apparatus 200 may receive a reference signal 210. In this example reference signal 210 may be passed to a mixer 230. Mixer 230 may also receive the output of an oscillator 220. In some examples, oscillator 220 may receive a returned signal 240 from a certain transponder within the radar system. In these examples, the frequency with which oscillator 220 oscillates may correspond to the carrier frequency of the certain transponder. In this way, oscillator 220 may represent a filter that passes signals returned by the certain transponder (while filtering out or eliminating signals returned by transponders that utilize different carrier frequencies). In other words, oscillator 220 may enable apparatus 200 to selectively and/or accurately analyze signals from the certain transponder.

In the example of FIG. 2, mixer 230 may combine (e.g., multiply) reference signal 210 and returned signal 240 after returned signal 240 is passed through oscillator 220. Mixer 230 may output sum, difference, and/or component frequencies of these two signals. For example, the frequency components of the output of mixer 230 may include the carrier frequency of the certain transponder and the beat frequency. In some examples, the output of mixer 230 may be passed to a filter 250. Filter 250 may represent any type of filter designed to extract the beat frequency from a beat signal. For example, filter 250 may represent a bandpass filter whose center frequency corresponds to an expected beat frequency. In this way, filter 250 may operate in conjunction with oscillator 220 to extract beat frequencies from signals returned by a certain transponder.

Filter 250 may filter and then optionally rectify the signal received from mixer 230. In some examples, rectifying the signal may double the frequency of the signal. Filter 250 may then pass the filtered signal to an envelope detector 260 that generates an envelope of the filtered signal. The frequency of this envelope signal may correspond to the beat frequency (or twice the beat frequency). Accordingly, envelope detector 260 may pass the envelope signal to a pulse detector 270 that determines (via, e.g., a comparator or similar device) the frequency of the envelope signal. In the event that filter 250 rectified the signal, pulse detector 270 may take into account that the detected frequency may be twice the beat frequency.

Apparatus 200 may include any additional or alternative element not illustrated in FIG. 2. For example, in addition to or instead of envelope detector 260, apparatus 200 may include a square law detector. In addition, apparatus 200 may separate signals returned from a particular transponder via a bandpass filter whose center frequency corresponds to the carrier frequency utilized by the transponder (instead of via a mixer and/or oscillator, as illustrated in FIG. 2). In further examples, apparatus 200 may include both a mixer that shifts the frequency of a received signal to a certain frequency (e.g., an intermediate frequency) and a bandpass filter centered around the certain frequency. Such a configuration may be advantageous in applications where a bandpass filter with a high center frequency is unavailable and/or impractical. Apparatus 200 may include any additional type or form of component, including a high pass filter and/or a rectifier.

Apparatus 200 may perform a variety of actions in response to determining the beat frequency. For example, apparatus 200 may pass the beat frequency to a processing device that calculates the range and/or current location of the transponder that returned the FMCW radar signal. In some embodiments, the processing device may then store information about the range and/or location of the transponder. Additionally or alternatively, the processing device may pass this information to an artificial reality system that provides virtual content (such as images and/or haptic feedback) to the user. The artificial reality system may use this information to generate and/or improve the virtual content. For example, the artificial reality system may adjust the location at which the user perceives a portion of virtual content to account for an updated and/or current location of the user. In another example, the artificial reality system may adjust the location and/or appearance of a virtual representation of the user that is provided to an additional user remotely.

In some embodiments, a radar system may include a separate instance of apparatus 200 for all or a portion of the transponders within the radar system. For example, a radar system may include an instance of apparatus 200 for each different carrier frequency utilized by the transponders. These instances of apparatus 200 may represent and/or act as communication channels that facilitate separating and analyzing signals returned by individual transponders. For example, when a radar device transmits an FMCW radar signal within the vicinity of multiple transponders, the radar device may simultaneously receive returned FMCW radar signals from each transponder. The combination of these signals may include and/or correspond to the superposition of each different carrier frequency and each different beat frequency associated with each transponder that returned an FMCW radar signal. Extracting the frequency components of a signal returned by a particular transponder may be necessary and/or helpful in order to accurately and/or efficiently determine the range of the transponder.

Figure 3:
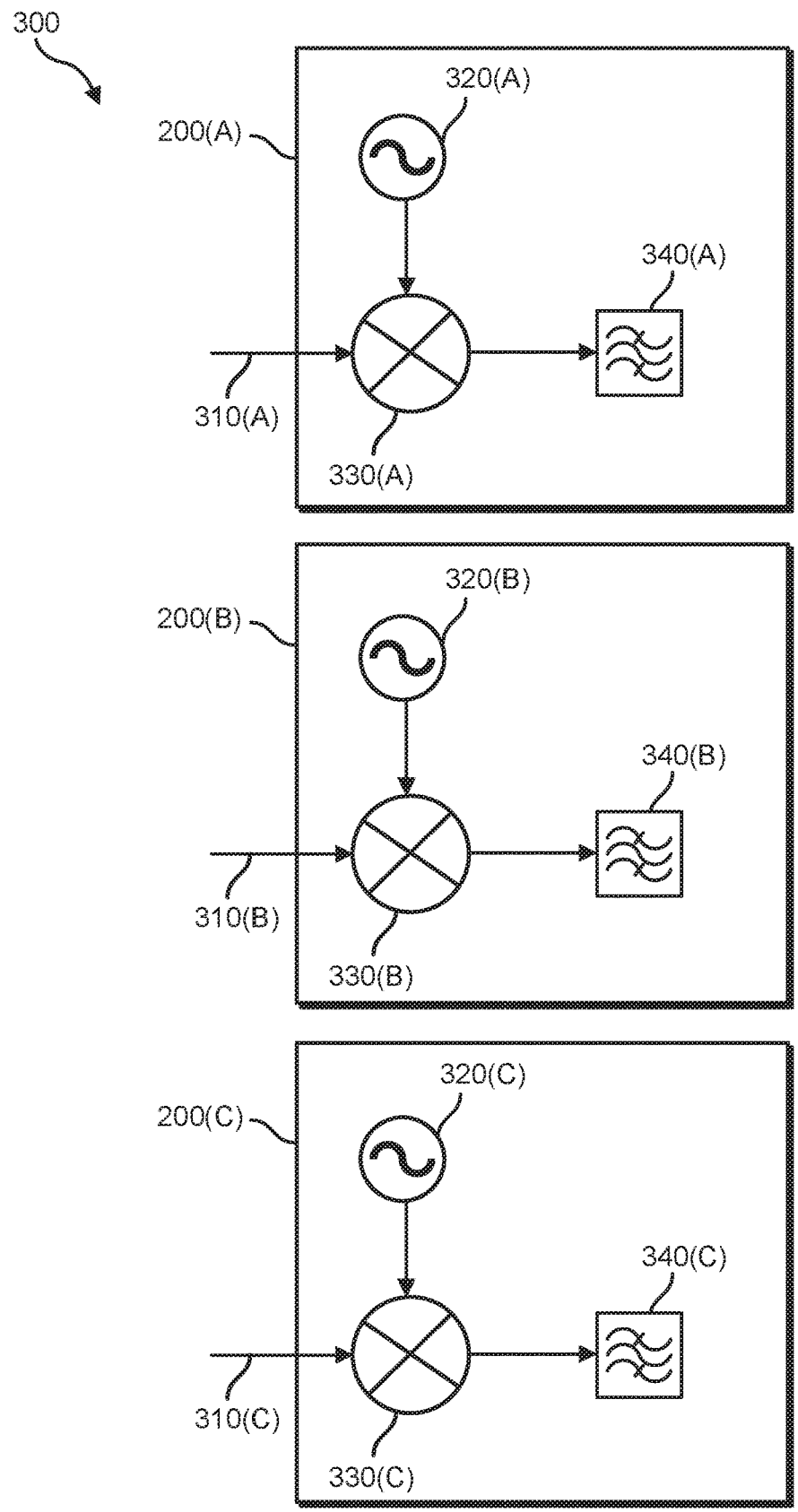
FIG. 3 is a diagram of additional exemplary apparatuses for extracting beat frequencies that may be used in connection with embodiments of this disclosure.

FIG. 3 illustrates an exemplary implementation 300 that includes multiple instances of apparatus 200. In this example, apparatuses 200(A-C) may each include one of oscillators 320(A-C), one of mixers 330(A-C), and one of filters 340(A-C). Each instance of these components (and any additional components not illustrated in FIG. 3) may be generally the same or similar. However, in some embodiments, oscillators 320(A-C) may each be tuned to a different carrier frequency. For example, oscillator 320(A) within apparatus 200(A) may pass signals with carrier frequencies of 1 megahertz, oscillator 320(B) within apparatus 200(B) may pass signals with carrier frequencies of 2 megahertz, and oscillator 320(C) within apparatus 200(C) may pass signals with carrier frequencies of 3 megahertz. In some embodiments, apparatuses 200(A-C) may each receive a reference signal (i.e., one of reference signals 310(A-C)) that has been adjusted in accordance with the frequency of the oscillator within the apparatus. For example, reference signal 310(A) may represent and/or correspond to an FMCW radar signal whose frequency has been shifted by 1 megahertz.

In some examples, a radar system may include multiple transponders that utilize the same carrier frequency (and therefore the same communication channel). In these examples, the radar system may implement any additional or alternative technique for eliminating or reducing signal confusion caused by the multiple transponders. For example, the radar system may direct only a single or a small number of transponders that utilize the same carrier frequency to be active (e.g., returning FMCW radar signals) at any point in time.

Figure 4:
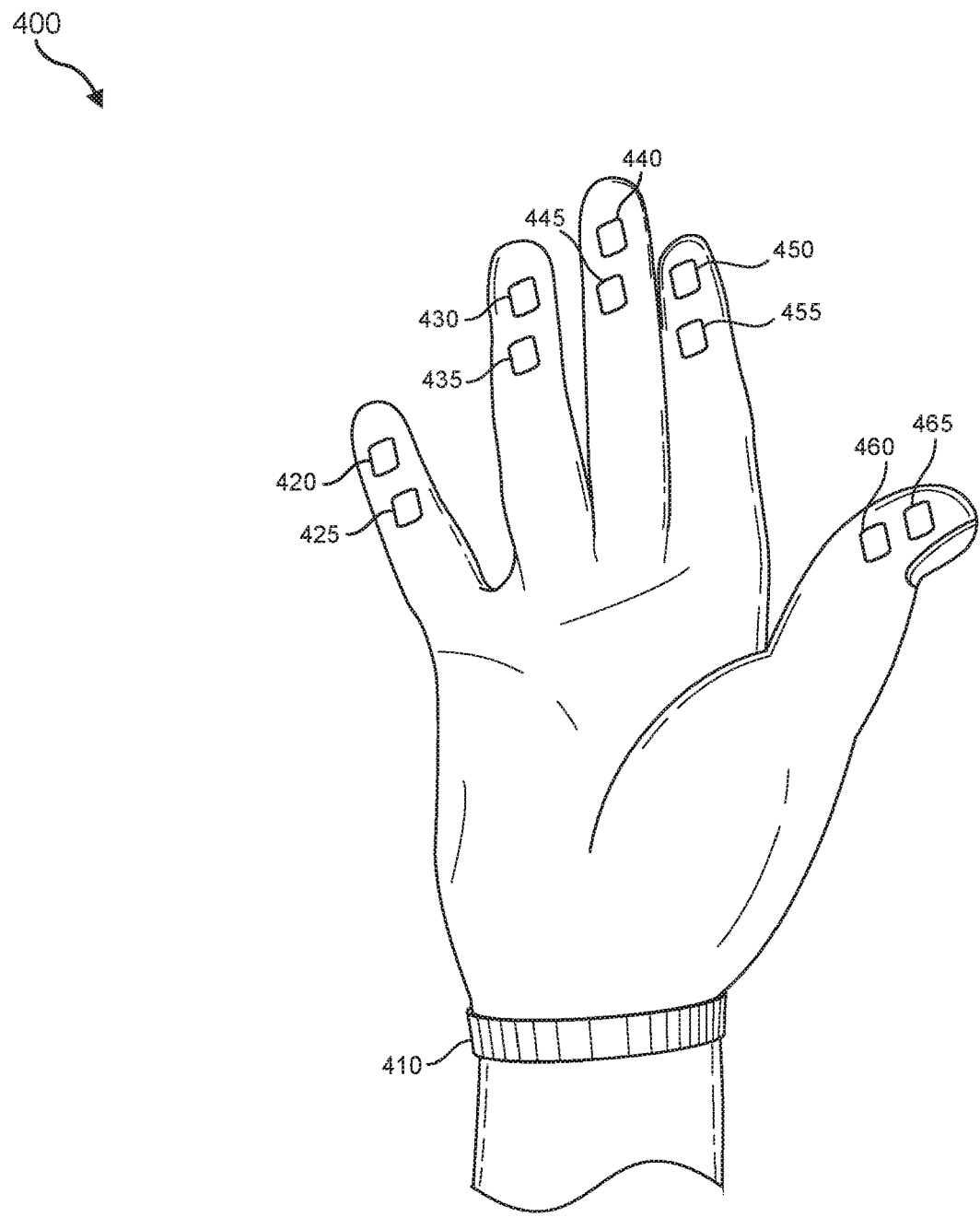
FIG. 4 is an illustration of an exemplary wearable artificial reality device that may be used in connection with embodiments of this disclosure.

FIG. 4 is an illustration of an exemplary wearable device 400 that facilitates radar-based artificial reality tracking. In some embodiments, the term "wearable device" may refer to any type or form of computing device that is worn by a user of an artificial reality system as part of an article of clothing, an accessory, and/or an implant. Examples of wearable device include, without limitation, headsets, headbands, head-mounted displays, wristbands, gloves, glasses, and/or ankle bands.

In one example, wearable device 400 may represent and/or include a glove that is designed to be worn on the hand/or wrist of a user. Wearable device 400 may include and/or contain a variety of different materials. Examples of such materials include, without limitation, cottons, polyesters, nylons, elastics, plastics, neoprene, rubbers, metals, combinations or variations of one or more of the same, and/or any other suitable materials. Wearable device 400 may be defined and/or formed in a variety of shapes and/or sizes with the aim of securing to the hand and/or wrist of a user of an artificial reality system. In some examples, one or more components of wearable device 400 (such as a wristband 410) may be adjustable to provide a one-size-fits-most feature.

In some examples, wearable device 400 may include one or more transponders. For example, as shown in FIG. 1, wearable device 400 may include transponders 420, 425, 430, 435, 440, 445, 450, 455, 460, and 465. In one embodiment, all or a portion of these transponders may correspond and/or be generally similar to transponder 100 illustrated in FIG. 1. In addition, these transponders may be fastened, attached, and/or secured to wearable device 400 in any suitable manner and/or configuration.

In one embodiment, the transponders on wearable device 400 may facilitate determining the position of the front of each of the user's fingers. For example, these transponders may be secured in locations that correspond to the user's fingertips when the user is wearing wearable device 400. Wearable device 400 may include any additional or alternative transponders not shown in FIG. 4, such as one or more transponders that facilitate determining the position of the back of the user's fingers and/or the position of the user's palm.

In some examples, all or a portion of the transponders on wearable device 400 may introduce frequency offsets into FMCW radar signals returned by the transponders. For example, each transponder on wearable device 400 may return FMCW radar signals that have a different carrier frequency. In this example, a radar device that transmits FMCW radar signals to wearable device 400 may include a separate communication channel (e.g., an instance of apparatus 200) for all or a portion of the transponders on wearable device 400.

As an example, transponder 450 may return FMCW radar signals with carrier frequencies of 1 megahertz (corresponding to apparatus 200(A) to FIG. 3), transponder 455 may return FMCW radar signals with carrier frequencies of 2 megahertz (corresponding to apparatus 200(B) in FIG. 3), and transponder 460 may return FMCW radar signals with carrier frequencies of 3 megahertz (corresponding to apparatus 200(C) in FIG. 3). These separate carrier frequencies (and corresponding communication channels) may facilitate tracking the location of specific parts of the user's hand. For example, a radar system may utilize beat frequencies identified by apparatus 200(A) to track the location of the tip of the user's index finger.

Figure 5:
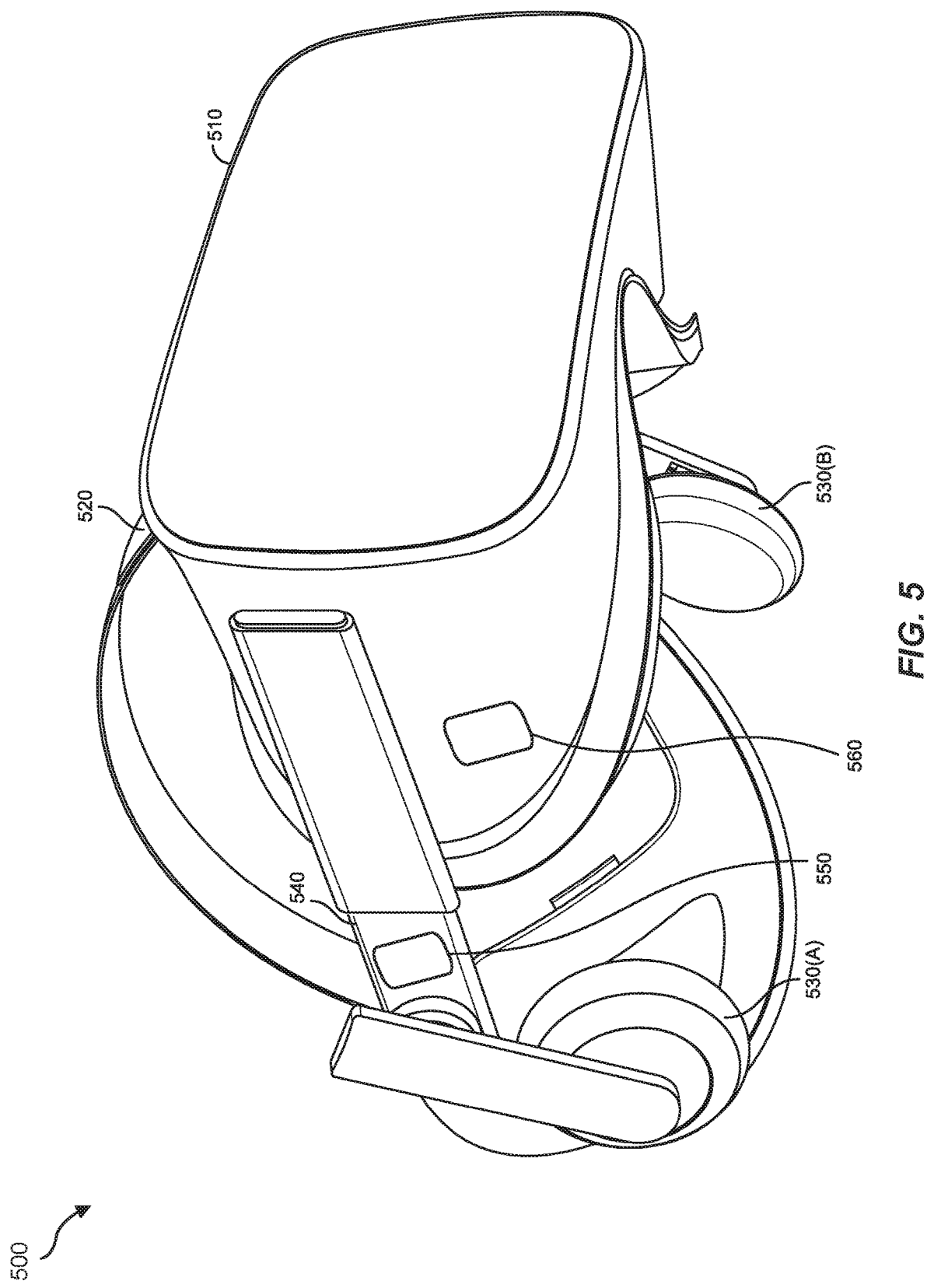
FIG. 5 is an illustration of an additional exemplary wearable artificial reality device that may be used in connection with embodiments of this disclosure.

FIG. 5 illustrates an exemplary wearable device 500 that facilitates radar-based artificial reality tracking. In one embodiment, wearable device 500 may include and/or represent a head-mounted display that is designed to be worn on a user's face. As shown in FIG. 5, wearable device 500 may include a front rigid body 510 and a band 520 shaped to fit around the user's head. Wearable device 500 may also include output audio transducers 530(A) and 530(B). In addition, wearable device 500 may include a connector 540 that connects front rigid body 510 to band 520 and/or audio transducers 530(A).

As shown in FIG. 5, wearable device 500 may include one or more radar devices, such as a radar device 550 and a radar device 560. In some embodiments, radar devices 550 and 560 may each contain and/or be communicatively coupled to one or more instances of apparatus 200 illustrated in FIG. 2. In one example, all or a portion of these instances of apparatus 200 may be designed and/or dedicated to separating and analyzing signals returned by certain transponders. In addition, radar devices 550 and 560 may include any number or type of additional components, such as a receiving antenna, a transmitting antenna, a signal generator, a processing device, a memory device, a communication interface, and the like.

As shown in FIG. 5, radar device 550 may be secured to connector 540 and radar device 560 may be secured to front rigid body 510. However, the radar devices of wearable device 500 may be secured in any suitable location, pattern, and/or configuration. For example, wearable device 500 may include one radar device on each side of front rigid body 510 and a radar device on the top of band 520. In another example, wearable device 500 may include multiple radar devices secured along the top of band 520. In some embodiments, wearable device 500 may include multiple radar devices (e.g., at least three radar devices) to facilitate three-dimensional localization of a transponder.

Wearable device 500 may also include one or more additional components not illustrated in FIG. 5. For example, wearable device 500 may include a processing device that directs, controls, and/or receives input from one or more radar devices secured to wearable device 500. In some embodiments, this processing device may be part of and/or communicate with an artificial reality system that presents virtual content to the user. Wearable device 500 may also include any number or type of communication interfaces, memory devices, displays, power supplies, and the like.

Figure 6:
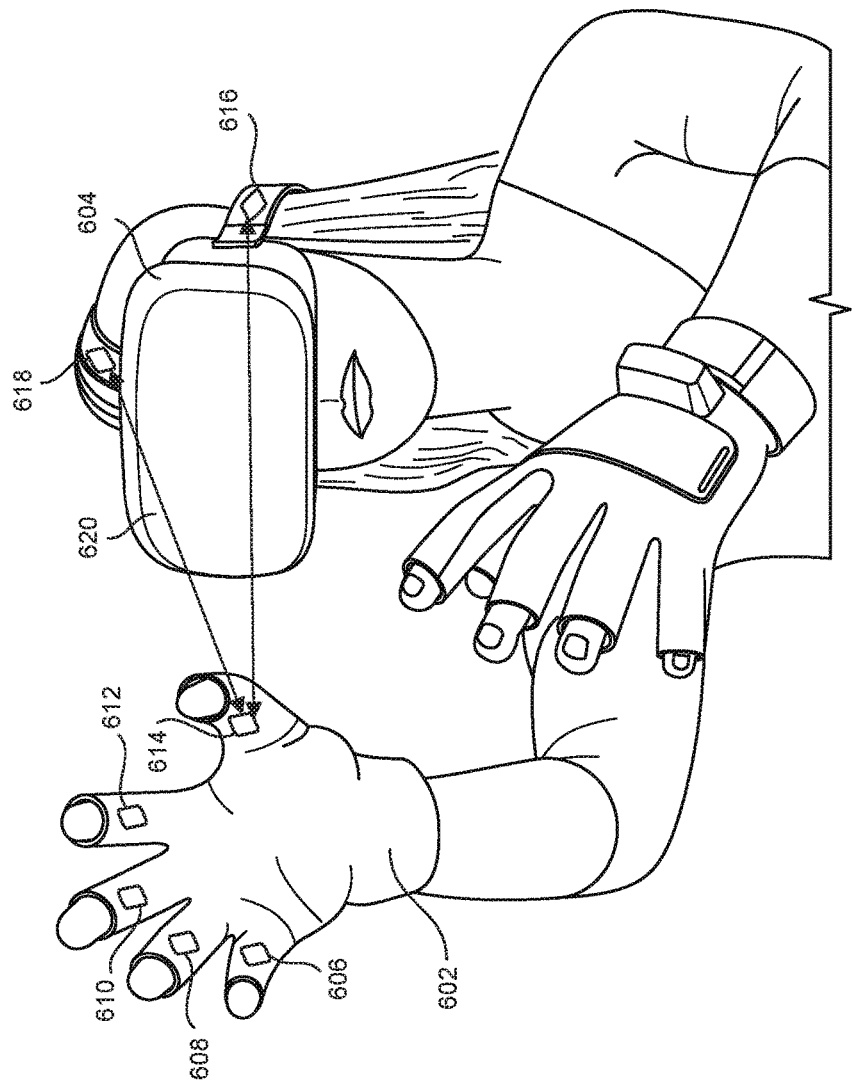
FIG. 6 is an illustration of an exemplary artificial reality environment that may be used in connection with embodiments of this disclosure.

FIG. 6 illustrates an exemplary system 600 that facilitates radar-based artificial reality tracking. Specifically, FIG. 6 illustrates a user wearing a glove 602 (which may correspond to an embodiment of wearable device 400 in FIG. 4) and a head-mounted display 604 (which may correspond to an embodiment of wearable device 500 in FIG. 5). In this example, head-mounted display 604 may include one or more radar devices, such as a radar device 616 and a radar device 618. In addition, glove 602 may include one or more transponders, such as transponders 606, 608, 610, 612, and 614. In some embodiments, radar devices 616 and/or 618 may determine the range of one or more of the transponders secured to glove 602. The radar devices may then pass information about the range of the transponders to a processing device and/or artificial reality system that provides virtual content to the user via head-mounted display 604. For example, the processing device and/or artificial reality system may determine a current physical location of the portions of the user corresponding to the transponders of glove 602. The artificial reality system may then provide virtual content to the user based on these locations.

As a specific use-case example, head-mounted display 604 may provide virtual content (e.g., images, videos, and/or graphics) to the user via a display 620. In this example, head-mounted display 604 may project images on display 620 that create the perception of the user holding an object. Based on the current location of the transponders on glove 602, head-mounted display 604 may select and/or adjust the location of the projected images on display 620 to provide a believable and immersive virtual experience for the user. In some embodiments, head-mounted display 620 may periodically update the location and/or appearance of the projected images to account for movement of the user's hand and/or head.

Figure 7:
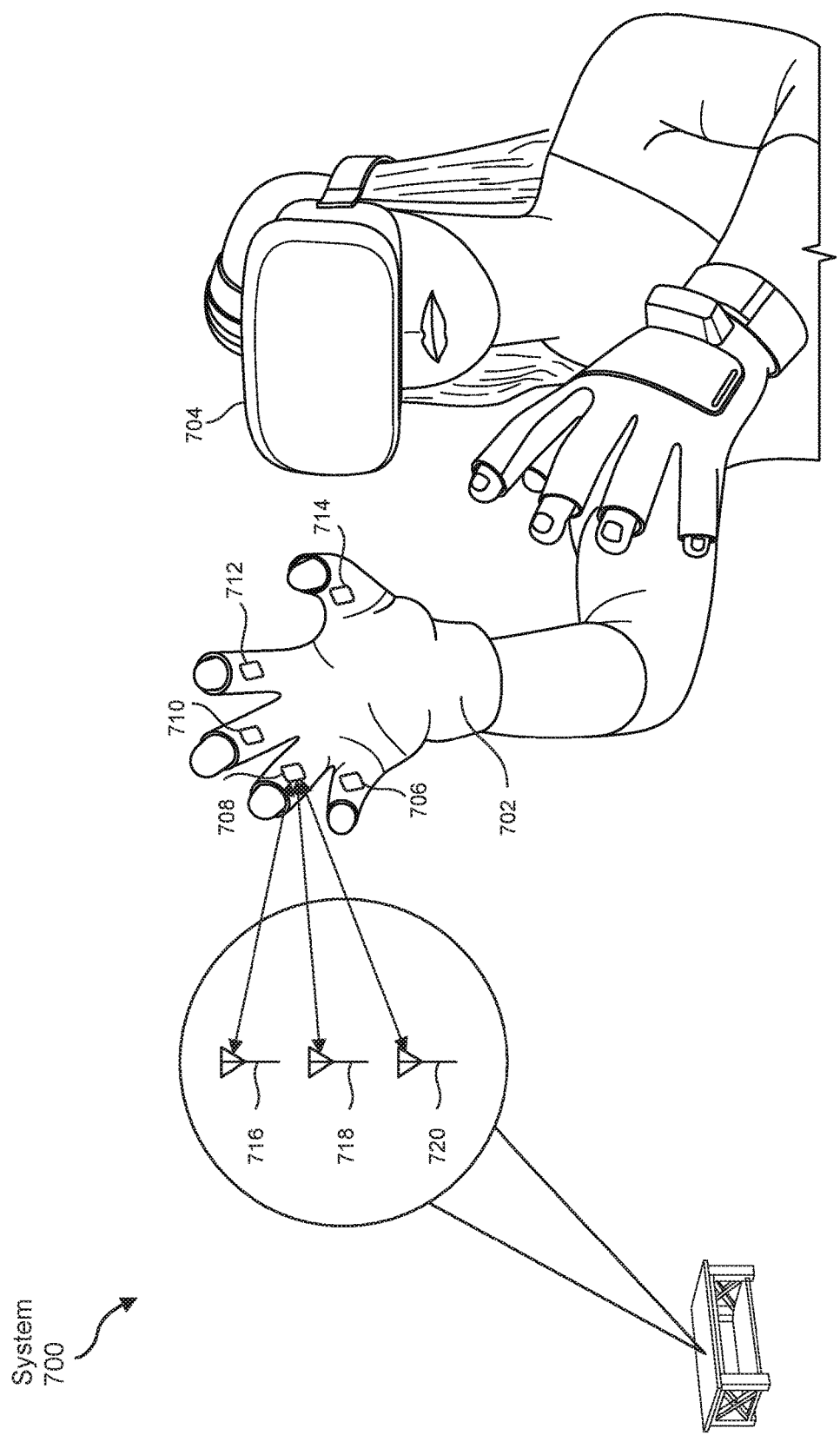
FIG. 7 is an illustration of an additional exemplary artificial reality environment that may be used in connection with embodiments of this disclosure.

FIG. 7 illustrates an exemplary system 700 that facilitates radar-based artificial reality tracking. Specifically, FIG. 7 illustrates a user wearing a glove 702 (which may correspond to an embodiment of wearable device 400 in FIG. 4) and a head-mounted display 704 (which may correspond to an embodiment of wearable device 500 in FIG. 5). FIG. 7 also illustrates an array of radar devices that may include radar devices 717, 718, and 720. These radar devices may be located within the physical environment surrounding the user (rather than on a wearable device worn by the user). For example, as illustrated in FIG. 7, the radar devices may be located on a nearby table. In contrast to the radar devices of system 600, the radar devices of system 700 may be stationary (e.g., in a fixed location).

In some embodiments, radar devices 717, 718, and/or 720 may periodically determine the range of all or a portion of the transponders of glove 702 (e.g., transponders 706, 708, 710, 712, and 714). The radar devices may then pass information about the range of the transponders to a processing device and/or artificial reality system. In one embodiment, this artificial reality system may provide virtual content to the user via head-mounted display 704 (as discussed in connection with FIG. 5). Additionally or alternatively, the artificial reality system may provide virtual content to an additional (e.g., remote) user.

As a specific use-case example, the user wearing glove 702 may interact remotely (via, e.g., a computing device and/or a network) with an additional user. In this example, the artificial reality system may provide a virtual representation of all or a portion of the user wearing glove 702 to the additional user. For example, based on the current location of the transponders on glove 702, the artificial reality system may insert an image of all or a portion of the user's hand into a virtual three-dimensional environment displayed to the additional user. Additionally, the artificial reality system may periodically update the location and/or appearance of the image to account for movement of the user's hand. These features of the disclosed radar systems may be useful and/or advantageous in a variety of applications, including gaming applications and remote-conferencing applications.

Figure 8:
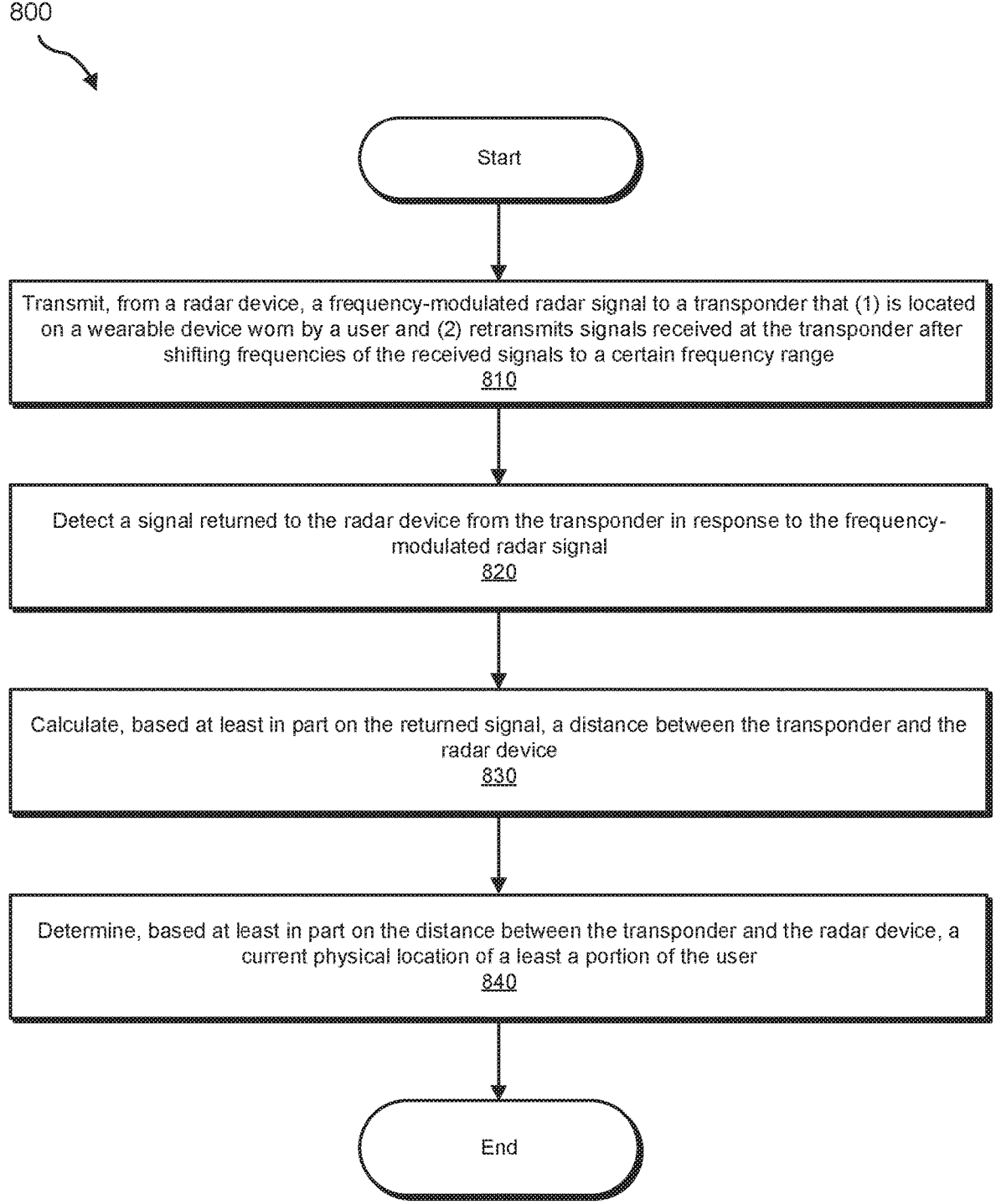
FIG. 8 is a flowchart of an exemplary method for radar-based artificial reality tracking.

FIG. 8 is a flow diagram of an exemplary method 800 for radar-based artificial reality tracking according to any of the embodiments disclosed herein. The steps shown in FIG. 8 may incorporate and/or involve various sub-steps and/or variations consistent with the descriptions described above in connection with FIGS. 1-7.

As illustrated in FIG. 8, at step 810 a radar system may transmit, from a radar device, a frequency-modulated radar signal to a transponder that is located on a wearable device worn by a user. In one embodiment, the transponder may retransmit signals received at the transponder after shifting frequencies of the received signals to a certain frequency range. For example, the transponder may shift the carrier frequency of the received radar signal by a certain amount before returning the radar signal to the radar device.

At step 820 in FIG. 8, the radar system may detect a signal returned to the radar device from the transponder in response to the frequency-modulated radar signal. For example, the radar system may receive the returned signal via a communication channel that is tuned to the carrier frequency with which the transponder retransmits radar signals. In this way, the radar system may separate the signal returned by the transponder from signals returned by other transponders (e.g., transponders that utilize different carrier frequencies).

At step 830 in FIG. 8, the radar system may calculate, based at least in part on the returned signal, a distance between the transponder and the radar device. For example, the radar system may combine the returned signal with a reference signal (e.g., the frequency-modulated radar signal that was transmitted to the transponder) and then extract a beat frequency from the combined signal. This beat frequency may be proportional to the distance between the transponder and the radar device. In some embodiments, the radar system may identify the particular transponder that transmitted the returned signal based on the carrier frequency of the returned signal and/or the communication channel that analyzed the returned signal.

At step 840 in FIG. 8, the radar system may determine, based at least in part on the distance between the transponder and the radar device, a current physical location of at least a portion of the user. For example, the radar system may determine a three-dimensional location of the portion of the user's body that is coupled to and/or in contact with the transponder. In some embodiments, the radar system may pass information about the current physical location of the portion of the user to an artificial reality system. The artificial reality system may then generate and/or modify one or more virtual components presented to the user based on the current physical location of the portion of the user.

EXAMPLE EMBODIMENTS

Example 1: An apparatus for radar-based artificial reality tracking may include a at least one transponder that (1) is located on a wearable device worn by a user and (2) retransmits signals received at the transponder after shifting frequencies of the received signals to a certain frequency range. The apparatus may also include at least one radar device that (1) transmits a frequency-modulated radar signal to the transponder and (2) receives signals whose frequencies are within the certain frequency range. In addition, the apparatus may include a processing device that (1) detects a signal returned to the radar device from the transponder, (2) calculates, based on the returned signal, a distance between the transponder and the radar device, and then (3) determines, based on the distance between the transponder and the radar device, a current physical location of at least a portion of the user.

Example 2: The apparatus of Example 1, further comprising an additional wearable device that is worn by the user and secures the radar device.

Example 3: The apparatus of Examples 1 or 2, wherein the transponder shifts the frequencies of the received signals to the certain frequency range by mixing the received signals with a signal whose frequency is within the certain frequency range Example 4: The apparatus of any of Examples 1-3, wherein the wearable device secures a plurality of transponders and each of the plurality of transponders shifts frequencies of received signals to a different frequency range such that each of the plurality of transponders retransmits signals with a different carrier frequency.

Example 5: The apparatus of any of Examples 1-4, wherein the radar device comprises a separate communication channel for each different carrier frequency with which the plurality of transponders retransmit signals.

Example 6: The apparatus of Example 5, wherein at least one separate communication channel comprises an oscillator tuned to a particular carrier frequency.

Example 7: The apparatus of Example 5, wherein the processing device identifies a particular transponder within the plurality of transponders that transmitted the returned signal based at least in part on a communication channel in which the radar device received the returned signal.

Example 8: The apparatus of Example 4, wherein the returned signal comprises a superposition of (1) a carrier frequency with which the transponder retransmits signals and (2) a beat frequency that is proportional to the distance between the transponder and the radar device.

Example 9: The apparatus of Example 8, wherein the processing device calculates the distance between the transponder and the radar device by extracting the beat frequency from the returned signal Example 10: The apparatus of Example 9, wherein the processing device extracts the beat frequency from the returned signal by (1) mixing the returned signal with the frequency-modulated radar signal to produce a mixed signal, (2) passing the mixed signal through an envelope filter to produce a filtered signal, (3) determining a frequency of the filtered signal.

Example 11: The apparatus of any of Examples 1-10, wherein the processing device further passes the current physical location of the portion of the user to an artificial reality system that provides virtual content to the user and the artificial reality system modifies at least one virtual component of the artificial reality system to account for the current physical location of the portion of the user.

Example 12: A radar system for radar-based artificial reality tracking may include a wearable device that is worn by a user of an artificial reality system. The radar system may also include at least one transponder that (1) is secured to the wearable device and (2) retransmits signals received at the transponder after shifting frequencies of the received signals to a certain frequency range. In addition, the radar system may include at least one radar device that (1) transmits a frequency-modulated radar signal to the plurality of transponders and (2) receives signals whose frequencies are within the certain frequency range. The radar system may further include a processing device communicatively coupled to the radar device, wherein the processing device (1) detects a signal returned to the radar device from the transponder in response to the frequency-modulated radar signal, (2) calculates, based at least in part on the returned signal, a distance between the transponder and the radar device, and then (3) determines, based at least in part on the distance between the transponder and the radar device, a current physical location of at least a portion of the user.

Example 13: The radar system of Example 12, wherein the transponder shifts the frequencies of the received signals to the certain frequency range by mixing the received signals with a signal whose frequency is within the certain frequency range.

Example 14: The radar system of Examples 12 or 13, wherein the wearable device secures a plurality of transponders and each of the plurality of transponders shifts frequencies of received signals to a different frequency range such that each of the plurality of transponders retransmits signals with a different carrier frequency.

Example 15: The radar system of Example 14, wherein the radar device comprises a separate communication channel for each different carrier frequency with which the plurality of transponders retransmit signals.

Example 16: The radar system of Example 15, wherein at least one separate communication channel comprises an oscillator tuned to a particular carrier frequency.

Example 17: The radar system of Example 15, wherein the processing device identifies a particular transponder within the plurality of transponders that transmitted the returned signal based at least in part on a communication channel in which the radar device received the returned signal.

Example 18: The radar system of any of Examples 12-17, further comprising an additional wearable device that is worn by the user and secures the radar device.

Example 19: The radar system of Example 18, wherein the wearable device comprises an artificial reality glove and the additional wearable device comprises an artificial reality helmet.

Example 20: A method for radar-based artificial reality tracking may include (1) transmitting, from a radar device, a frequency-modulated radar signal to a transponder that (A) is located on a wearable device worn by a user and (B) retransmits signals received at the transponder after shifting frequencies of the received signals to a certain frequency range, (2) detecting a signal returned to the radar device from the transponder in response to the frequency-modulated radar signal, (3) calculating, based at least in part on the returned signal, a distance between the transponder and the radar device, and then (4) determining, based at least in part on the distance between the transponder and the radar device, a current physical location of at least a portion of the user.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 900 in FIG. 9. Other artificial reality systems may include a NED that also provides visibility into the real world (e.g., augmented-reality system 1000 in FIG. 10) or that visually immerses a user in an artificial reality (e.g., virtual-reality system 1200 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
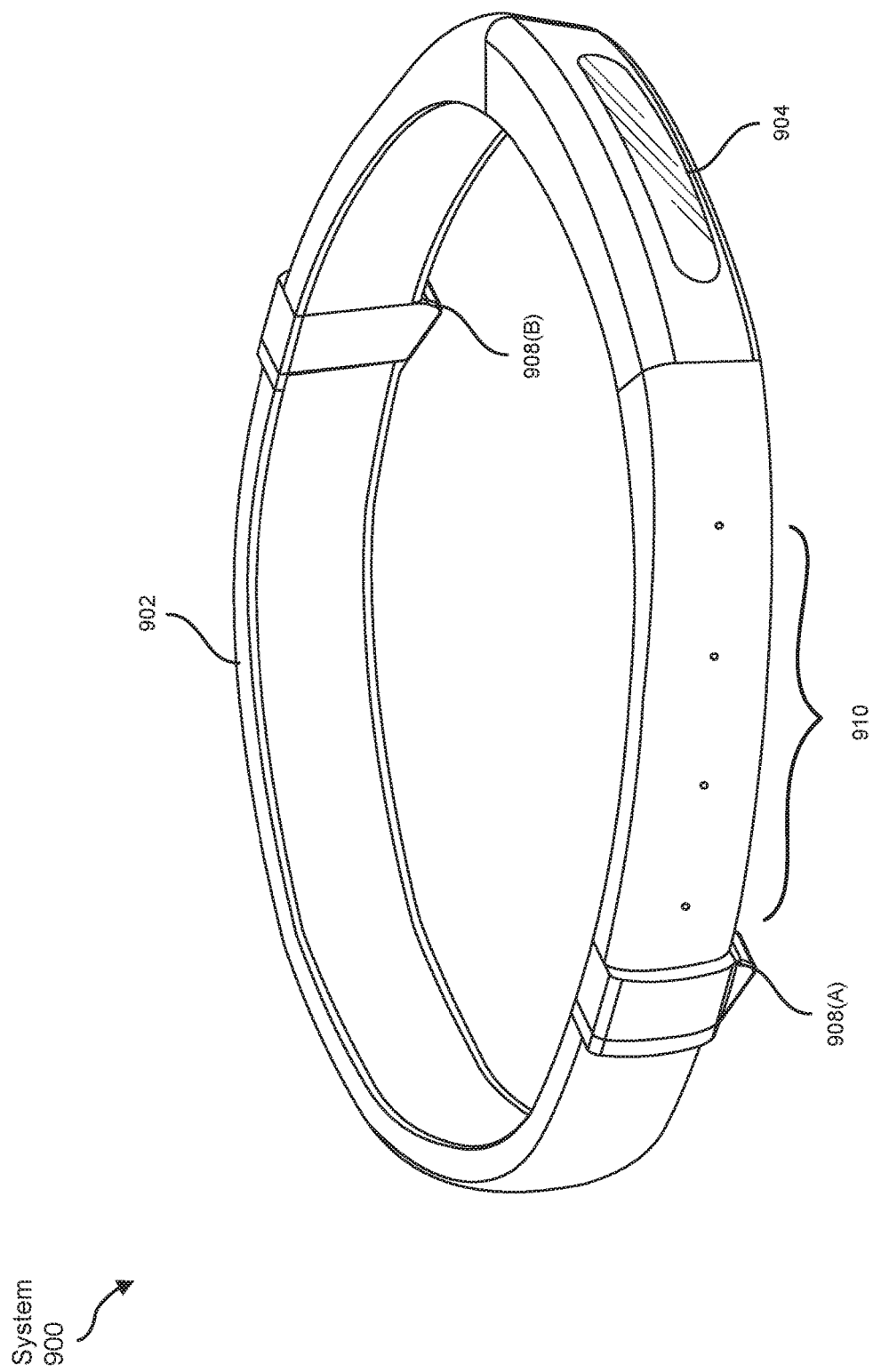
FIG. 9 is an illustration of an exemplary artificial-reality headband that may be used in connection with embodiments of this disclosure.

Turning to FIG. 9, augmented-reality system 900 generally represents a wearable device dimensioned to fit about a body part (e.g., a head) of a user. As shown in FIG. 9, system 900 may include a frame 902 and a camera assembly 904 that is coupled to frame 902 and configured to gather information about a local environment by observing the local environment. Augmented-reality system 900 may also include one or more audio devices, such as output audio transducers 908(A) and 908(B) and input audio transducers 910. Output audio transducers 908(A) and 908(B) may provide audio feedback and/or content to a user, and input audio transducers 910 may capture audio in a user's environment.

As shown, augmented-reality system 900 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 900 may not include a NED, augmented-reality system 900 may include other types of screens or visual feedback devices (e.g., a display screen integrated into a side of frame 902).

Figure 10:
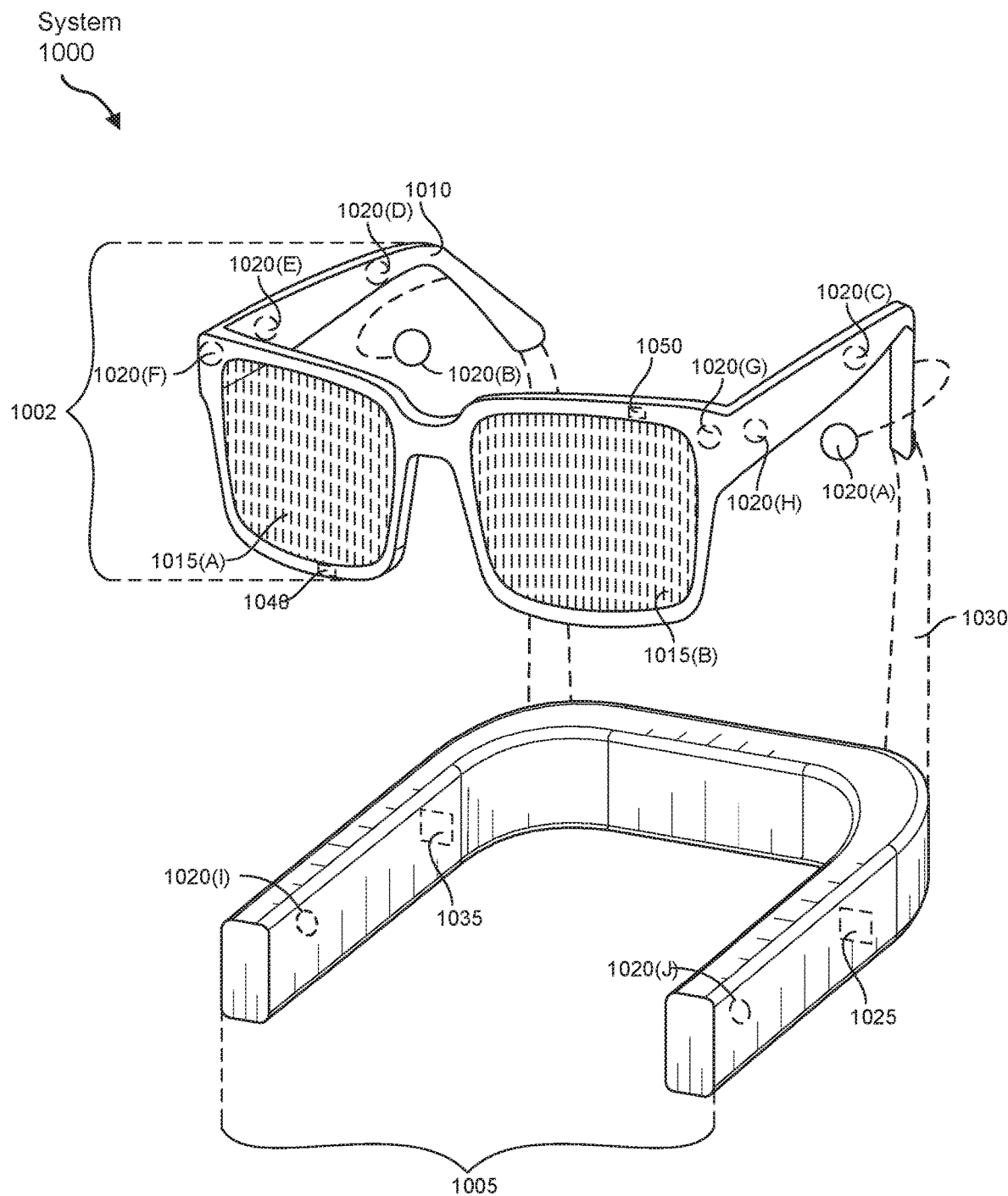
FIG. 10 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent a position sensor, an inertial measurement unit (IMU), a depth camera assembly, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

Augmented-reality system 1000 may also include a microphone array with a plurality of acoustic transducers 1020(A)-1020(J), referred to collectively as acoustic transducers 1020. Acoustic transducers 1020 may be transducers that detect air pressure variations induced by sound waves. Each acoustic transducer 1020 may be configured to detect sound and convert the detected sound into an electronic format (e.g., an analog or digital format). The microphone array in FIG. 2 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(I) and 1020(J), which may be positioned on a corresponding neckband 1005.

In some embodiments, one or more of acoustic transducers 1020(A)-(F) may be used as output transducers (e.g., speakers). For example, acoustic transducers 1020(A) and/or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by the controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer, or some combination thereof.

Acoustic transducers 1020(A) and 1020(B) may be positioned on different parts of the user's ear, such as behind the pinna or within the auricle or fossa. Or, there may be additional acoustic transducers on or surrounding the ear in addition to acoustic transducers 1020 inside the ear canal. Having an acoustic transducer positioned next to an ear canal of a user may enable the microphone array to collect information on how sounds arrive at the ear canal. By positioning at least two of acoustic transducers 1020 on either side of a user's head (e.g., as binaural microphones), augmented-reality device 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments, acoustic transducers 1020(A) and 1020(B) may be connected to augmented-reality system 1000 via a wireless connection (e.g., a Bluetooth connection). In still other embodiments, acoustic transducers 1020(A) and 1020(B) may not be used at all in conjunction with augmented-reality system 1000.

Acoustic transducers 1020 on frame 1010 may be positioned along the length of the temples, across the bridge, above or below display devices 1015(A) and 1015(B), or some combination thereof. Acoustic transducers 1020 may be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers and other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof. Furthermore, Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(I) and 1020(J)) that are part of the microphone array (or potentially form their own microphone subarray). Neckband 1005 may also include a controller 1025 and a power source 1035.

Acoustic transducers 1020(I) and 1020(J) of neckband 1005 may be configured to detect sound and convert the detected sound into an electronic format (analog or digital). In the embodiment of FIG. 10, acoustic transducers 1020(I) and 1020(J) may be positioned on neckband 1005, thereby increasing the distance between the neckband acoustic transducers 1020(I) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

Power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUs), one or more tracking emitters or detectors, and/or any other suitable device or system for creating an artificial reality experience.

Artificial reality systems may include a variety of types of visual feedback mechanisms. For example, display devices in augmented-reality system 1100 and/or virtual-reality system 1200 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 900, augmented-reality system 1000, and/or virtual-reality system 1100 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 10 and 11, output audio transducers 1008(A), 1008(B), 1106(A), and 1106(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1020 may include condenser microphones, dynamic microphones, ribbon microphones, and/or any other type or form of input transducer. In some embodiments, a single transducer may be used for both audio input and audio output.

Figure 11:
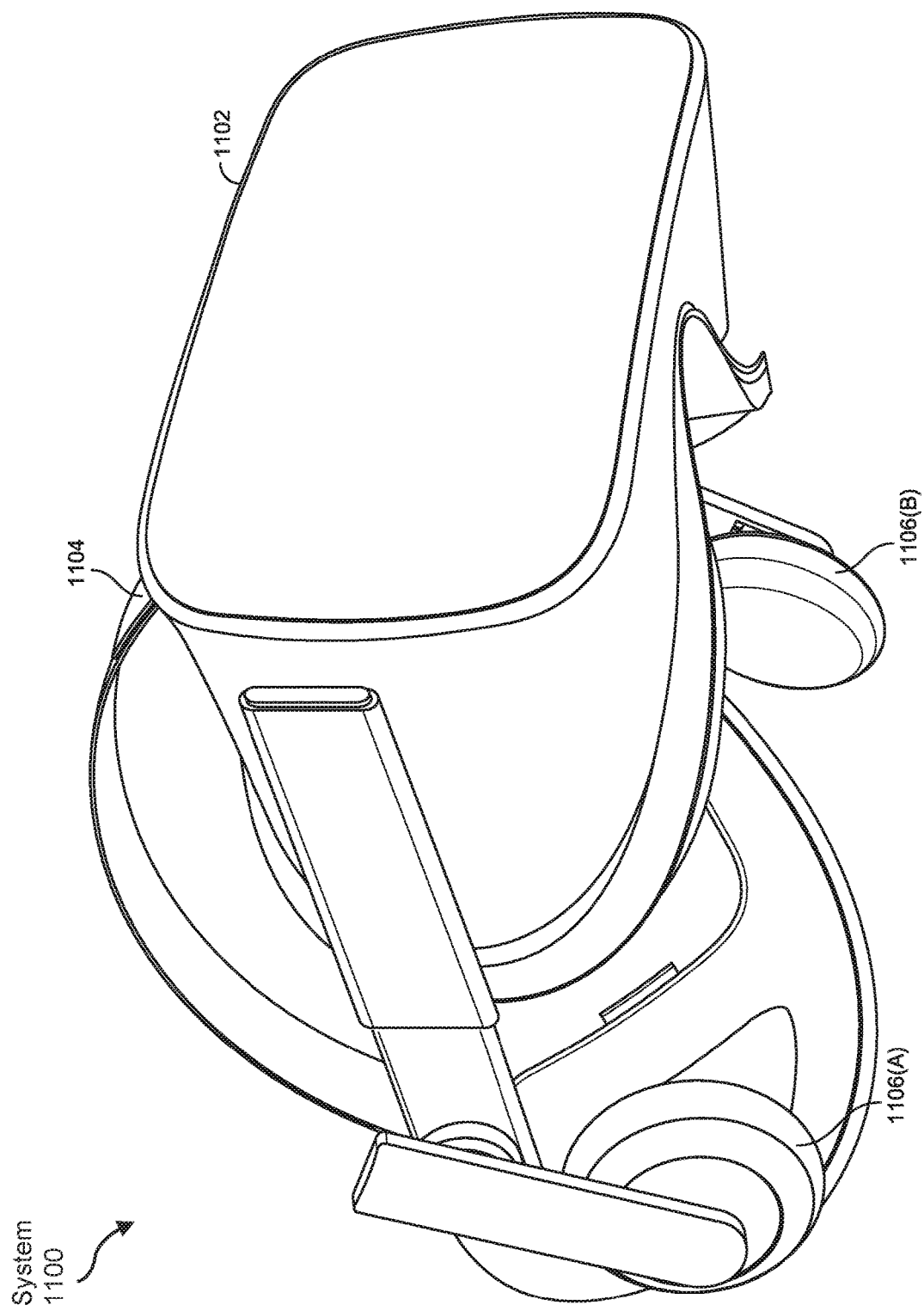
FIG. 11 is an illustration of an exemplary virtual-reality headset that may be used in connection with embodiments of this disclosure.

While not shown in FIGS. 10-11, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, artificial reality systems 900, 1000, and 1100 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 12:
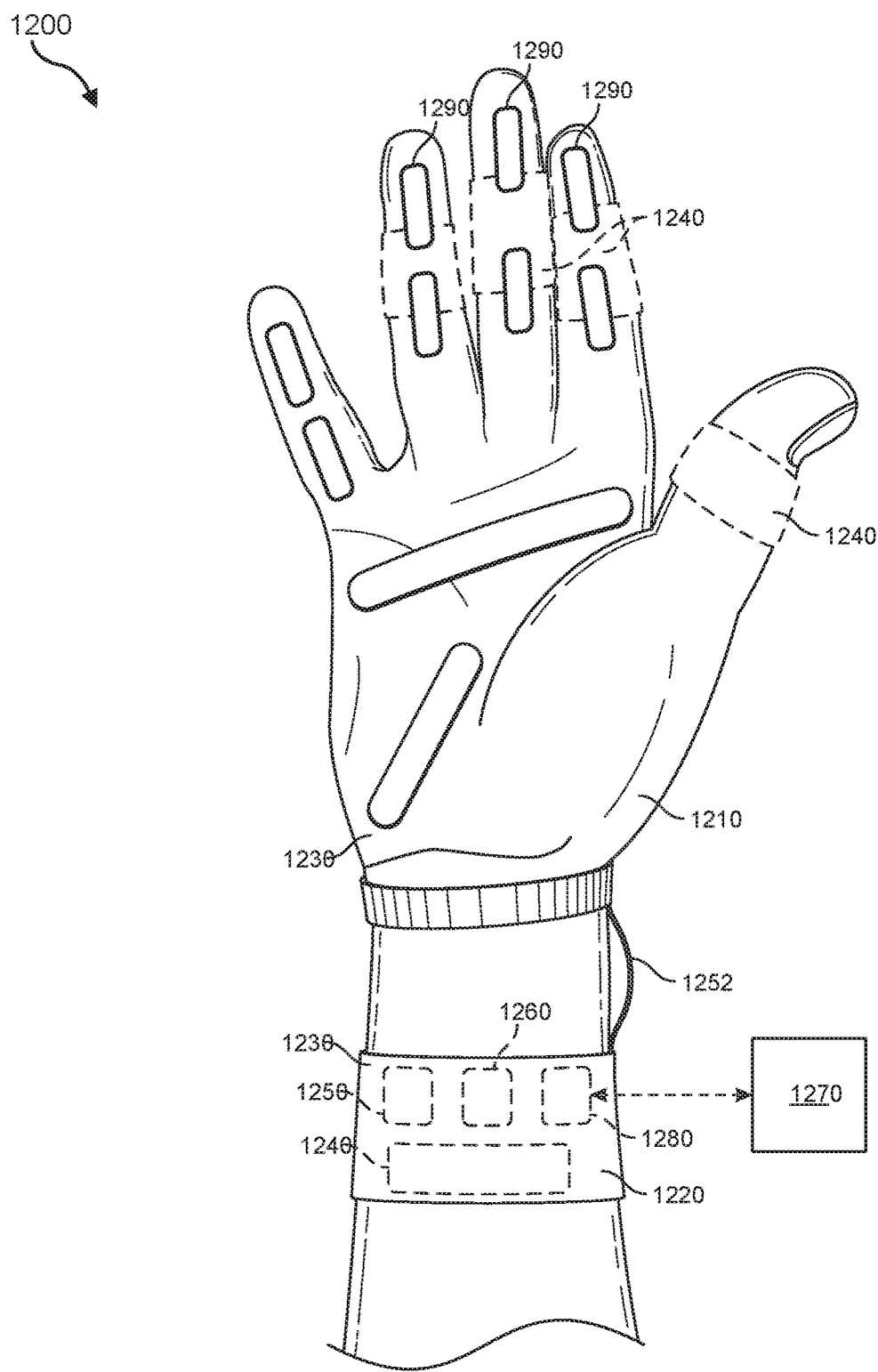
FIG. 12 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 12 illustrates a vibrotactile system 1200 in the form of a wearable glove (haptic device 1210) and wristband (haptic device 1220). Haptic device 1210 and haptic device 1220 are shown as examples of wearable devices that include a flexible, wearable textile material 1230 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1240 may be positioned at least partially within one or more corresponding pockets formed in textile material 1230 of vibrotactile system 1200. Vibrotactile devices 1240 may be positioned in locations to provide a vibrating sensation (e.g., haptic feedback) to a user of vibrotactile system 1200. For example, vibrotactile devices 1240 may be positioned to be against the user's finger(s), thumb, or wrist, as shown in FIG. 12. Vibrotactile devices 1240 may, in some examples, be sufficiently flexible to conform to or bend with the user's corresponding body part(s).

A power source 1250 (e.g., a battery) for applying a voltage to the vibrotactile devices 1240 for activation thereof may be electrically coupled to vibrotactile devices 1240, such as via conductive wiring 1252. In some examples, each of vibrotactile devices 1240 may be independently electrically coupled to power source 1250 for individual activation. In some embodiments, a processor 1260 may be operatively coupled to power source 1250 and configured (e.g., programmed) to control activation of vibrotactile devices 1240.

Vibrotactile system 1200 may be implemented in a variety of ways. In some examples, vibrotactile system 1200 may be a standalone system with integral subsystems and components for operation independent of other devices and systems. As another example, vibrotactile system 1200 may be configured for interaction with another device or system 1270. For example, vibrotactile system 1200 may, in some examples, include a communications interface 1280 for receiving and/or sending signals to the other device or system 1270. The other device or system 1270 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 1280 may enable communications between vibrotactile system 1200 and the other device or system 1270 via a wireless (e.g., Wi-Fi, Bluetooth, cellular, radio, etc.) link or a wired link. If present, communications interface 1280 may be in communication with processor 1260, such as to provide a signal to processor 1260 to activate or deactivate one or more of the vibrotactile devices 1240.

Vibrotactile system 1200 may optionally include other subsystems and components, such as touch-sensitive pads 1290, pressure sensors, motion sensors, position sensors, lighting elements, and/or user interface elements (e.g., an on/off button, a vibration control element, etc.). During use, vibrotactile devices 1240 may be configured to be activated for a variety of different reasons, such as in response to the user's interaction with user interface elements, a signal from the motion or position sensors, a signal from the touch-sensitive pads 1290, a signal from the pressure sensors, a signal from the other device or system 1270, etc.

Although power source 1250, processor 1260, and communications interface 1280 are illustrated in FIG. 12 as being positioned in haptic device 1220, the present disclosure is not so limited. For example, one or more of power source 1250, processor 1260, or communications interface 1280 may be positioned within haptic device 1210 or within another wearable textile.

Figure 13:
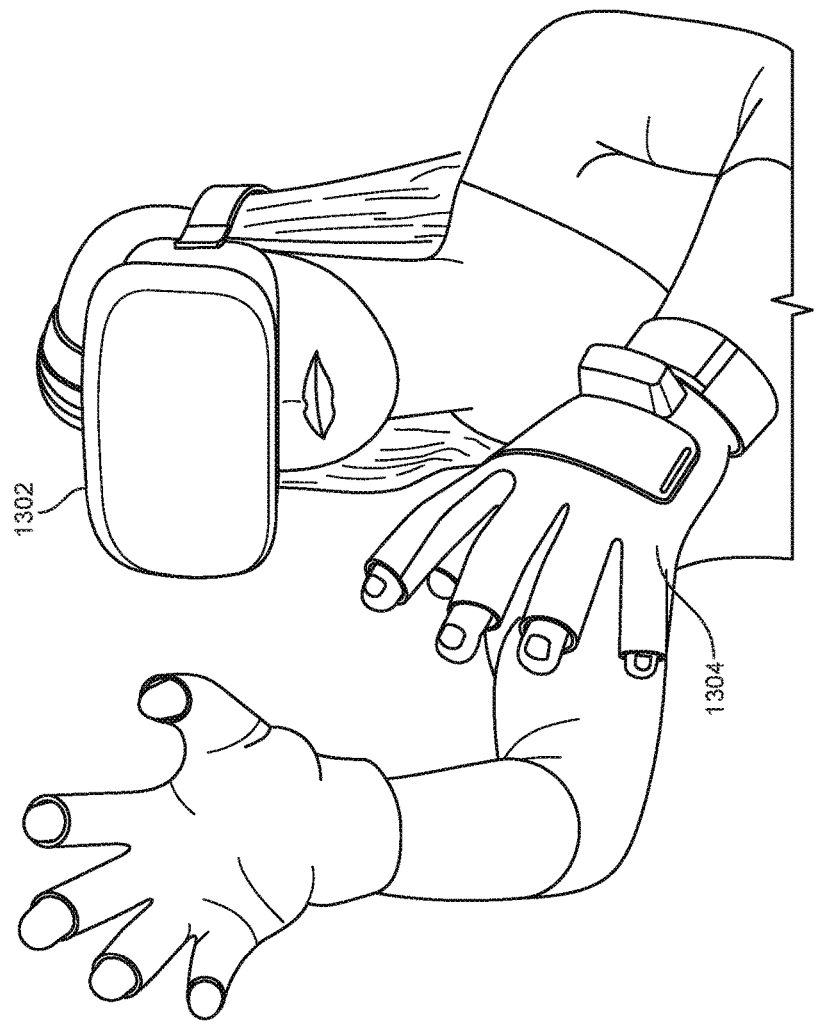
FIG. 13 is an illustration of an exemplary virtual-reality environment according to embodiments of this disclosure.

Haptic wearables, such as those shown in and described in connection with FIG. 12, may be implemented in a variety of types of artificial-reality systems and environments. FIG. 13 shows an example artificial reality environment 1300 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 1302 generally represents any type or form of virtual-reality system, such as virtual-reality system 1100 in FIG. 11. Haptic device 1304 generally represents any type or form of wearable device, worn by a use of an artificial reality system, that provides haptic feedback to the user to give the user the perception that he or she is physically engaging with a virtual object. In some embodiments, haptic device 1304 may provide haptic feedback by applying vibration, motion, and/or force to the user. For example, haptic device 1304 may limit or augment a user's movement. To give a specific example, haptic device 1304 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1304 to send action requests to a console. Examples of action requests include, without limitation, requests to start an application and/or end the application and/or requests to perform a particular action within the application.

Figure 14:
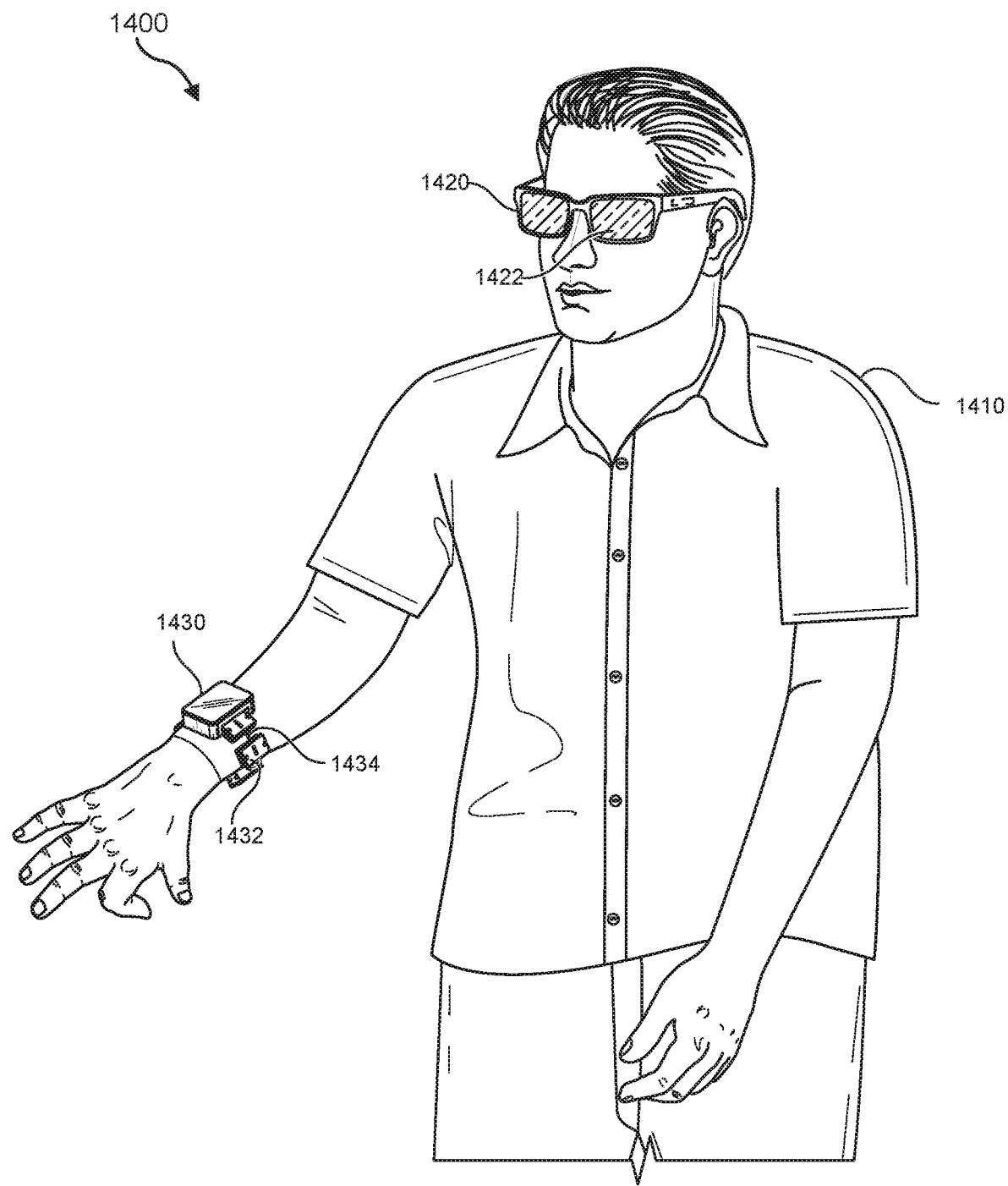
FIG. 14 is an illustration of an exemplary augmented-reality environment according to embodiments of this disclosure.

While haptic interfaces may be used with virtual-reality systems, as shown in FIG. 13, haptic interfaces may also be used with augmented-reality systems, as shown in FIG. 14. FIG. 14 is a perspective view a user 1410 interacting with an augmented-reality system 1400. In this example, user 1410 may wear a pair of augmented-reality glasses 1420 that have one or more displays 1422 and that are paired with a haptic device 1430. Haptic device 1430 may be a wristband that includes a plurality of band elements 1432 and a tensioning mechanism 1434 that connects band elements 1432 to one another.

One or more of band elements 1432 may include any type or form of actuator suitable for providing haptic feedback. For example, one or more of band elements 1432 may be configured to provide one or more of various types of cutaneous feedback, including vibration, force, traction, texture, and/or temperature. To provide such feedback, band elements 1432 may include one or more of various types of actuators. In one example, each of band elements 1432 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1210, 1220, 1304, and 1430 may include any suitable number and/or type of haptic transducer, sensor, and/or feedback mechanism. For example, haptic devices 1210, 1220, 1304, and 1430 may include one or more mechanical transducers, piezoelectric transducers, and/or fluidic transducers. Haptic devices 1210, 1220, 1304, and 1430 may also include various combinations of different types and forms of transducers that work together or independently to enhance a user's artificial-reality experience. In one example, each of band elements 1432 of haptic device 1430 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   at least one transponder that:
      is located on a wearable device worn by a user; and
      retransmits signals received at the transponder after shifting frequencies of the received signals to a certain frequency range;
   at least one radar device that:
      transmits a frequency-modulated radar signal to the transponder; and
      receives signals whose frequencies are within the certain frequency range; and
   a processing device communicatively coupled to the radar device, wherein the processing device:
      detects a signal returned to the radar device from the transponder in response to the frequency-modulated radar signal;
      calculates, based at least in part on the returned signal, a distance between the transponder and the radar device; and
      determines, based at least in part on the distance between the transponder and the radar device, a current physical location of at least a portion of the user.

2. The system of claim 1, further comprising an additional wearable device that:
   is worn by the user; and
   secures the radar device.

3. The system of claim 1, wherein the transponder shifts the frequencies of the received signals to the certain frequency range by mixing the received signals with a signal whose frequency is within the certain frequency range.

4. The system of claim 1, wherein:
   the wearable device secures a plurality of transponders; and
   each of the plurality of transponders shifts frequencies of received signals to a different frequency range such that each of the plurality of transponders retransmits signals with a different carrier frequency.

5. The system of claim 4, wherein the radar device comprises a separate communication channel for each different carrier frequency with which the plurality of transponders retransmit signals.

6. The system of claim 5, wherein at least one separate communication channel comprises an oscillator tuned to a particular carrier frequency.

7. The system of claim 5, wherein the processing device identifies a particular transponder within the plurality of transponders that transmitted the returned signal based at least in part on a communication channel in which the radar device received the returned signal.

8. The system of claim 4, wherein the returned signal comprises a superposition of:
   a carrier frequency with which the transponder retransmits signals; and
   a beat frequency that is proportional to the distance between the transponder and the radar device.

9. The system of claim 8, wherein the processing device calculates the distance between the transponder and the radar device by extracting the beat frequency from the returned signal.

10. The system of claim 9, wherein the processing device extracts the beat frequency from the returned signal by:
    mixing the returned signal with the frequency-modulated radar signal to produce a mixed signal;
    passing the mixed signal through an envelope filter to produce a filtered signal; and
    determining a frequency of the filtered signal.

11. The system of claim 1, wherein:
    the processing device further passes the current physical location of the portion of the user to an artificial reality system that provides virtual content to the user; and
    the artificial reality system modifies at least one virtual component of the artificial reality system to account for the current physical location of the portion of the user.

12. A radar system comprising:
    a wearable device that is worn by a user of an artificial reality system;
    at least one transponder that:
       is secured to the wearable device; and
       retransmits signals received at the transponder after shifting frequencies of the received signals to a certain frequency range;
    at least one radar device that:
       transmits a frequency-modulated radar signal to the transponder; and
       receives signals whose frequencies are within the certain frequency range; and
    a processing device communicatively coupled to the radar device, wherein the processing device:
       detects a signal returned to the radar device from the transponder in response to the frequency-modulated radar signal;
       calculates, based at least in part on the returned signal, a distance between the transponder and the radar device; and
       determines, based at least in part on the distance between the transponder and the radar device, a current physical location of at least a portion of the user.

13. The radar system of claim 12, wherein the transponder shifts the frequencies of the received signals to the certain frequency range by mixing the received signals with a signal whose frequency is within the certain frequency range.

14. The radar system of claim 12, wherein:
the wearable device secures a plurality of transponders; and
each of the plurality of transponders shifts frequencies of received signals to a different frequency range such that each of the plurality of transponders retransmits signals with a different carrier frequency.

15. The radar system of claim 14, wherein the radar device comprises a separate communication channel for each different carrier frequency with which the plurality of transponders retransmit signals.

16. The radar system of claim 15, wherein at least one separate communication channel comprises an oscillator tuned to a particular carrier frequency.

17. The radar system of claim 15, wherein the processing device identifies a particular transponder within the plurality of transponders that transmitted the returned signal based at least in part on a communication channel in which the radar device received the returned signal.

18. The radar system of claim 12, further comprising an additional wearable device that:
is worn by the user; and
secures the radar device.

19. The radar system of claim 18, wherein:
the wearable device comprises an artificial reality glove; and
the additional wearable device comprises an artificial reality helmet.

20. A method comprising:
transmitting, from a radar device, a frequency-modulated radar signal to a transponder that:
is located on a wearable device worn by a user; and
retransmits signals received at the transponder after shifting frequencies of the received signals to a certain frequency range;
detecting a signal returned to the radar device from the transponder in response to the frequency-modulated radar signal;
calculating, based at least in part on the returned signal, a distance between the transponder and the radar device; and
determining, based at least in part on the distance between the transponder and the radar device, a current physical location of at least a portion of the user.

\* \* \* \* \*